(12) United States Patent
Arsenault et al.

(10) Patent No.: US 6,508,403 B2
(45) Date of Patent: Jan. 21, 2003

(54) PORTABLE APPARATUS FOR 3-DIMENSIONAL SCANNING

(75) Inventors: Michel Arsenault, Loretteville (CA); Éric Harvey, St-Augustin-de-Desmaures (CA)

(73) Assignee: Institut National d'Optique, Ste-Foy (CA)

(*) Notice: Subject to any disclaimer, the term of this patent is extended or adjusted under 35 U.S.C. 154(b) by 54 days.

(21) Appl. No.: 09/849,498

(22) Filed: May 4, 2001

(65) Prior Publication Data

US 2002/0162886 A1 Nov. 7, 2002

(51) Int. Cl.[7] ................................................. G06K 7/14

(52) U.S. Cl. .................................. 235/454; 235/462.32

(58) Field of Search ........................... 235/454, 462.32; 705/28

(56) References Cited

U.S. PATENT DOCUMENTS 5,873,070 A * 2/1999 Bunte et al. ................. 235/454

* cited by examiner

Primary Examiner—Harold I. Pitts
(74) Attorney, Agent, or Firm—Wallenstein & Wagner, Ltd.

(57) ABSTRACT

A system for three-dimensional scanning, comprising a three-dimensional scanning apparatus being manually maneuverable and comprising a profilometer including a light beam projector, an objective and a light detector. The profilometer is configured for obtaining a two-dimensional profile of an object by active triangulation. The apparatus further including a positioning device being trackable in a volume space for providing six degrees-of-freedom of the apparatus, whereby a three-dimensional profile is calculatable by relating the two-dimensional profile with time-corresponding positions and orientations of the apparatus. The system also has a three-dimensional profile calculator remote from the apparatus, for tracking the apparatus in the volume space and relating positions and orientations of the apparatus with a time-corresponding two-dimensional profile of the object for calculating a three-dimensional profile of the object and for referring the object to a static position and orientation.

13 Claims, 1 Drawing Sheet

PORTABLE APPARATUS FOR 3-DIMENSIONAL SCANNING

BACKGROUND OF THE INVENTION

1. Field of the Invention

The present invention generally relates to 3-dimensional scanning, and, more particularly, to a portable 3-dimensional scanning apparatus for hand-held operations.

2. Description of the Prior Art

In the field of information sensing, machine vision technologies provide valuable information about the environment and about specific objects of interest through close inspection. Known 3-D data acquisition systems have been provided using 3-D sensors based on the active triangulation principle. In such systems, a specific known and fixed pattern of illumination (i.e. structure illumination) is projected from a laser and optical arrangement on an object to be measured, and the intersection of that emitted pattern is observed from a known and fixed oblique angle by a digital camera, such as a charged coupled device (CCD) array, whereby the position of the illuminated points on the object translate to positions on the camera array and the position of the illuminated points on the object can be computed trigonometrically.

For instance, one of these systems is referred to as a laser profilometer, wherein as indicated, a laser beam is used for illumination. Such profilometers analyze deformations of a laser line on an object such as to evaluate, for instance, the depth (Z-axis) as well as the horizontal position (X-axis) of the object. Generally, the translation of either one of the profilometer and the object to be scanned with the help of a translation mechanism allows to obtain the missing vertical position (Y-axis). Consequently, a 3-D profile of the object is scanned.

The above described system is widely used in industrial environments whereat the objects to be scanned are conveyed, whereby no translation mechanism is required with the profilometer. However, this system is not as convenient when, for instance, the object to be scanned is idle and/or hard to displace. In such cases, it is necessary to move the profilometer. In the event where the piece is large and/or defines a complex shape, it may be complicated to move the profilometer with the help of a simple translation mechanism. Thus, the use of a robot is often required, thereby entailing an increase in costs and often a decrease in precision.

A versatile 3-D data acquisition system would allow to digitize without contact the 3-D shape of an object while computing the absolute position and orientation of its scanned points, thus giving an operator, in different instances, the freedom to manipulate the system as if he was painting the surface of this object. The gathered 3-D data could, for instance, be used offline for the update of a work site model or for close and specific inspection of the shape integrity of objects compared to their CAD models.

SUMMARY OF THE INVENTION

It is therefore an aim of the present invention to provide a profilometer trackable in a volume space for 3-D data acquisition.

It is a further aim of the present invention to provide a 3-D data acquisition system having a compact and portable scanner portion.

It is still a further aim of the present invention to provide an improved method for 3-D scanning of objects.

Therefore, in accordance with the present invention, there is provided an apparatus for three-dimensional scanning, said apparatus being manually maneuverable and comprising a profilometer including a light beam projector, an objective and a light detector, said profilometer configured for obtaining a two-dimensional profile of an object by active triangulation; and a positioning device being trackable in a volume space for providing six degrees-of-freedom of said apparatus; whereby a three-dimensional profile is calculatable by relating the two-dimensional profile with time-corresponding positions and orientations of said apparatus.

Also in accordance with the present invention, there is provided a system for three-dimensional scanning, comprising said above described apparatus, and further comprising a three-dimensional profile calculator remote from said apparatus for tracking said apparatus in said volume space and relating positions and orientations of said apparatus with a time-corresponding two-dimensional profile of the object for calculating a three-dimensional profile thereof and for referring the object to a static position and orientation.

Further in accordance with the present invention, there is provided a method for three-dimensional scanning, comprising the steps of (i) scanning a two-dimensional profile of an object with a profilometer projecting a light beam on the object and using active triangulation; (ii) tracking said profilometer in a volume space for obtaining positions and orientations thereof; and (iii) calculating a three-dimensional profile of the object by relating time-corresponding two-dimensional profile and positions and orientations.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
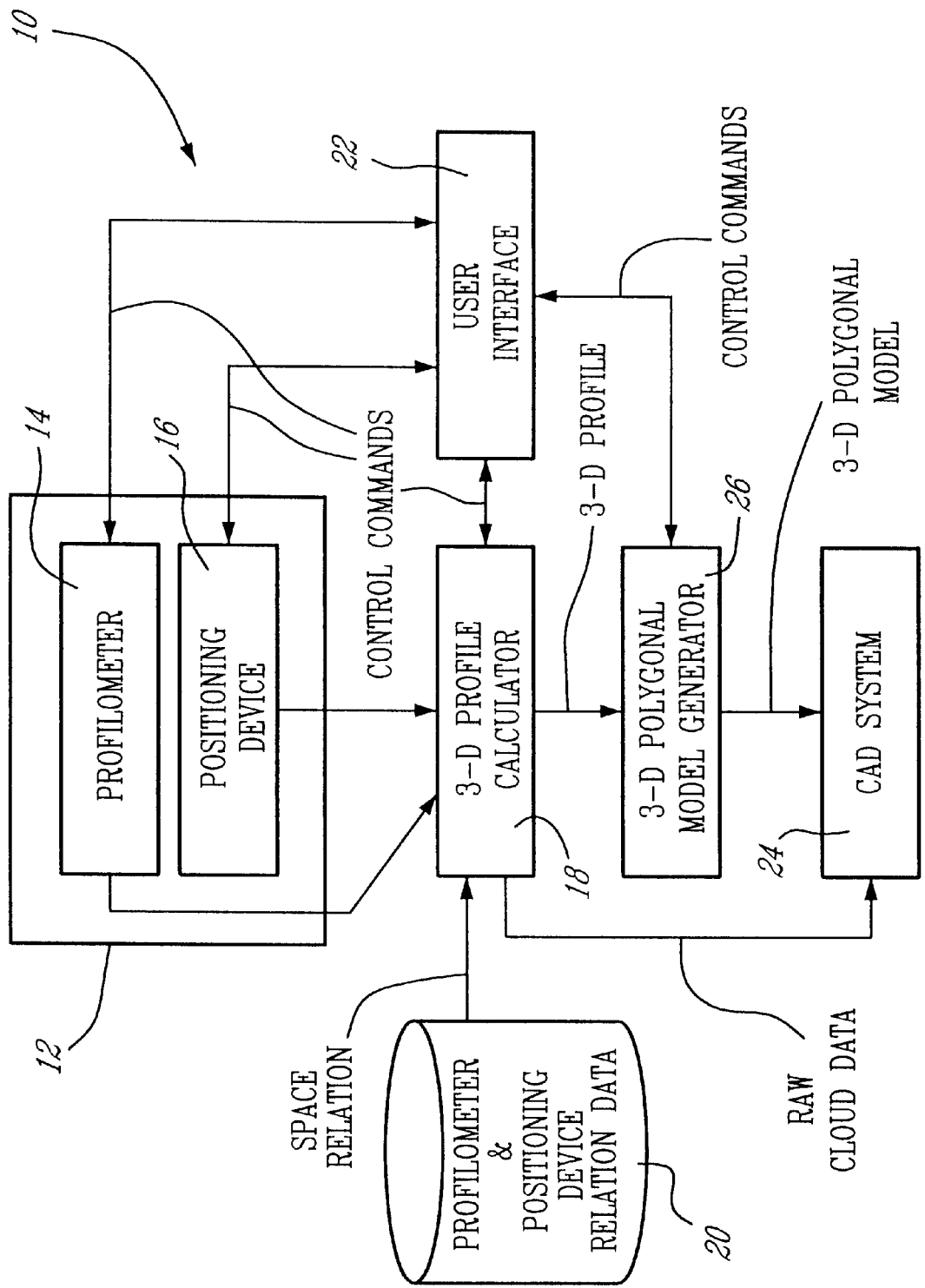
FIG. 1 is a block diagram illustrating an apparatus for 3-dimensional data acquisition in accordance with the present invention.

Referring now to FIG. 1, a 3-D data acquisition (3-D DA system) is generally shown at 10. The 3-D DA system 10 comprises a portable and compact 3-D scanning apparatus illustrated at 12, which comprises a profilometer 14 and a positioning device 16. The profilometer 14 transmits a 2-D profile of an object it scans to a 3-D profile calculator unit 18, which will be described hereinafter. The positioning device 16, integrally joined to the profilometer 14 to form the 3-D scanning apparatus 10, is trackable in a volume space by the 3-D profile calculator unit 18 such that its 6 degrees-of-freedom (DOF) are known. The profilometer and positioning device relation data is stored by the 3-D profile calculator unit 18 and is generally shown at 20, such that the scanned 2-D profile of the object is positioned and oriented in space by knowing the relation of the profilometer 14 and the positioning device 16, whereby a 3-D profile thereof is calculatable. The 3-D profile may be transmitted from the 3-D profile calculator unit 18 to a 3-D polygonal model generator 26 which will transform the 3-D profiles into a 3-D polygonal model, or from the 3-D profile calculator unit 18 to a CAD system 24 as raw cloud data. The 3-D polygonal model is then transmitted from the a 3-D polygonal model generator 26 to the CAD system 24. A user interface 22 is provided for commanding and controlling the 3-D profile calculator unit 18, the 3-D scanning apparatus 12 and the 3-D polygonal model generator 26.

The present application of a 3-D scanning apparatus 12 as an unattached hand-held scanner requires that the field of view be produced by the movement of a light pattern along the surface of an object to be digitized, as typically known of laser profilometers. The instantaneous field of view would be the length of the line of the structured light seen on a detector portion of the profilometer 14 and the field of view in the direction of the scan is defined by the path length of the scan.

For close range applications, the measurement performance and task requires a medium to high range resolution. The range resolution is usually evaluated in terms of the working range. As an example, a typical value for the range resolution is about 1/1000 of the working range taking into account the sub-pixel accuracy on the detector portion. This parameter is a function of the characteristics of the range measurement technique.

Other important parameters are mentioned below as examples and are not intended to limit the scope of the present invention. One such important parameter is the scanning speed. The time required for the recording of the image of the line is a function of the scanning speed and the maximum tolerable displacement of the line on the surface. If we assume that the scanning apparatus will be moved manually with a maximum speed of 100 mm/s, the integration time should be around 1 ms for a displacement of about 0.1 mm corresponding approximately to the line width of the focused laser beam on the surface of the object.

Another important parameter is the sampling rate, which is defined by the detector portion refresh rate. Actual standards CCD detectors can operate at 30 frames/sec. At this frame rate, the sampling interval in the scanning direction is 3.3 mm assuming a maximum scanning speed of 100 mm/s. The sampling interval perpendicular to the scanning direction would be the angular field of view divided by the number of pixels in a row. Typical parameters of a scanning device may include a stand-off of 100 mm and a working range of 100 mm.

Active profilometers offer the advantage of having their own illumination, being independent of the background radiation. For example, the use of a laser source as structured light may be specified in terms of wavelength (detector spectral response), power of energy (detector sensitivity) and power of consumption. Among the laser light sources available on the market, diode lasers are compact, reliable and are available in a broad range of power and wavelength. For close range operation and compact system requirement, this light source offers an obvious advantage, whereby a laser profilometer (illustrated at 14) using the above described active triangulation technique is proposed as optical range sensor. The profilometer 14 produces a light beam (i.e. laser) resulting in a line on the object to be scanned. The profilometer 14 also comprises an objective and a detector portion (e.g. CCD detector, CMOS), which measures the location of the image of the illuminated line on the object surface.

The 3-D scanning apparatus 12 requires a compact design of the profilometer 14 in order to be able to hold it with one hand. Accordingly, the laser profilometer preferably comprises a progressive scan miniature camera, an objective lens and a structured light laser projector. The casing of the above described profilometer 14 is comparable in size to that of a commercial camescope. It is pointed out that the detector must be tilted according to the Scheimpflug condition ("Optical Range Imaging Sensors, Machine Vision and Applications", by P. J. Besl, published in 1988, pp. 127–152).

Hand-held operations assume that the 3-D scanning apparatus 12 can be moved freely in space within a given working volume, preferably without any mechanical fixture. The object is scanned by simply moving the 3-D scanning apparatus 12 around continuously in any convenient orientation and location in a scanning session.

Full hand-held scanning requires that the positioning device 16 provides the 6 DOF of the 3-D scanning apparatus 12, whereby the instantaneous orientation (roll, pitch, yaw) and location (X, Y, Z) of the profilometer 14 can be measured in order to get its actual position and orientation in space. This way, the 2-D profile scanned by the profilometer 14 can be referenced in a static coordinate system which corresponds to the positioning device 16.

In the context of specific inspection or work site modeling, if the coordinate system of the positioning device 16 is known relative co an origin of a CAD model, then absolute measurements can be made and transposed in this CAD model. The accuracy of the positioning device 16 is important in the development of a hand-held 3-D scanning apparatus. On the other hand, the positioning system's accuracy has a major impact on other aspects such as its weight, its size and its price. In order to keep the hand-held 3-D scanning apparatus compact, portable and of relatively low cost, options for reducing the positioning system accuracy may be considered. One of these options is to use a less accurate positioning system that still allows the user to get an adequate looking display feedback during the scanning stage and use software techniques to improve the positioning accuracy in a post-processing stage.

The sampling rate is a less but still important issue. Once again, it should be higher or at least equal to the profilometer sampling race. The latency of the positioning device 16 should be as small as possible but, moreover, it shall be constant all along the scanning session. Since the positioning system and profilometer latencies are not necessarily the same, positioning and range data can be acquired at different times by the 3-D profile calculator unit 18. It is imperative to ensure that the registration of positioning and range data occurs for time corresponding events.

Some positioning systems need a line-of-sight which has to be maintained between emitters and receivers. In the present invention, this limitation has other constraints on the 3-D scanning apparatus working volume as some positions are usually prohibited. The use of no line-of-sight positioning systems, although not restricted by the present invention, would be a very interesting feature in the hand-held design of the 3-D scanning apparatus 18.

Other positioning systems suffer from various interferences. For instance, magnetic-based systems are usually affected by the presence of metallic objects inside or near the working volume. In the case of positioning systems based on inertial technology, the sensor output drifts over time.

Finally, if the positioning device 16 is to be attached to the profilometer 14, the compactness and portability features of the resulting 3-D scanning apparatus 12 require that the weight and the size thereof are as small as possible. The positioning device 16 shall not restrict the operation of the 3-D scanning apparatus 12 because of its weight or its size.

The positioning device 16 may be based on ultrasounds, Ultrasonic positioning devices determine distance by measuring the elapsed time of flight of an acoustic wave.

The ultrasonic positioning device, used in the first implementation of the present invention, allows full 6-DOF measurement in a volume space of approximately 1 m3 with an accuracy of about 2% of the emitter-receiver distance. Although it has accuracy, line-of-sight and space volume restrictions, its very low cost makes it an attractive candidate for the development of the present invention even though the latter should not be limited by the use of this specific ultrasonic positioning device.

The portable 3-D scanning apparatus 12 of the present invention may be used with a dedicated acquisition and visualization software, which is capable of displaying and manipulating the points as a 3-D image and to save it into a predetermined file format. Such a system could convert raw 3-D profile data into polygonal models and is embodied in FIG. 1 as a 3-D polygonal model calculator 26.

The profilometer 16 of the present invention may be calibrated using a special calibration test bench. Translation stages and special acquisition and analysis software are used to perform the calibration. A second calibration process consists in verifying the absolute offsets between the positioning device receiver coordinate system and the laser profilometer coordinate system. These offset values are used in the acquisition and visualization software for coordinate system transformation involved in producing the 3-D data points Accordingly, the present invention is based on the combination of a laser profilometer and a positioning device (ultrasonic or other) as it permits a more rapid and intuitive digitization of the shape of a given object. The applications of the present scanning apparatus 12 are varied. They also include, for instance, the creation of virtual catalogs on the Internet for the retail market, and also the creation and updating of virtual environments in the area of games or simulators, CAD model update, artefacts scanning and animation.

We claim:

1. An apparatus for three-dimensional scanning, said apparatus being manually maneuverable and comprising:
    a profilometer including a light beam projector, an objective and a light detector, said profilometer configured for obtaining a two-dimensional profile of an object by active triangulation; and
    a positioning device being trackable in a volume space for providing six degrees-of-freedom of said apparatus; whereby a three-dimensional profile is calculatable by relating the two-dimensional profile with time-corresponding positions and orientations of said apparatus.

2. The apparatus according to claim 1, wherein said light beam projector produces a laser beam.

3. The apparatus according to claim 1, wherein said positioning device is at least one of ultrasonic, inertial and optical.

4. The apparatus according to claim 1, wherein said light detector is a charge-coupled device.

5. A system for three-dimensional scanning, comprising: said apparatus according to claim 1; and further comprising a three-dimensional profile calculator remote from said apparatus for tracking said apparatus in said volume space and relating positions and orientations of said apparatus with a time-corresponding two-dimensional profile of the object for calculating a three-dimensional profile thereof and for referring the object to a static position and orientation.

6. The apparatus according to claim 5, wherein said light beam projector produces a laser beam.

7. The apparatus according to claim 5, wherein said positioning device is at least one of ultrasonic, inertial and optical.

8. The apparatus according to claim 5, wherein said light detector is a charge-coupled device.

9. A method for three-dimensional scanning, comprising the steps of:
    (i) scanning a two-dimensional profile of an object with a profilometer projecting a light beam on the object and using active triangulation;
    (ii) tracking said profilometer in a volume space for obtaining positions and orientations thereof; and
    (iii) calculating a three-dimensional profile of the object by relating time-corresponding two-dimensional profile and positions and orientations.

10. The method according to claim 9, wherein step (iii) includes referencing the object to a static position and orientation.

11. A three-dimensional profile calculator computer program product recorded in a computer readable memory for executing the method described in claim 10.

12. The method according to claim 9, further comprising a step of (iv) transforming the three-dimensional profile of the object to a three-dimensional polygonal model.

13. A three-dimensional polygonal model generator computer program product recorded in a computer readable memory for executing the step (iv) described in claim 12.

* * * * *